(12) United States Patent
Sugitani

(10) Patent No.: US 7,678,300 B2
(45) Date of Patent: Mar. 16, 2010

(54) OPTICAL FILM MANUFACTURING METHOD AND APPARATUS

(75) Inventor: Syouichi Sugitani, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 567 days.

(21) Appl. No.: 11/600,995

(22) Filed: Nov. 17, 2006

(65) Prior Publication Data
US 2007/0120278 A1    May 31, 2007

(30) Foreign Application Priority Data
Nov. 30, 2005    (JP) .............................. 2005-345694

(51) Int. Cl.
*B29D 7/01* (2006.01)

(52) U.S. Cl. .............. 264/1.6; 264/2.7; 264/212; 264/217; 264/280; 264/284; 425/72.1; 425/224; 425/385; 425/470

(58) Field of Classification Search ............... 264/212, 264/280, 284, 1.6, 2.7, 217; 425/72.1, 470, 425/224, 385
See application file for complete search history.

(56) References Cited

U.S. PATENT DOCUMENTS

| 2,336,310 | A   | 12/1943 | Spence et al.           |
|-----------|-----|---------|-------------------------|
| 2,367,603 | A   | 1/1945  | Nystrom                 |
| 2,492,977 | A   | 1/1950  | Fordyce et al.          |
| 2,492,978 | A   | 1/1950  | Fordyce et al.          |
| 2,607,704 | A   | 8/1952  | Fordyce et al.          |
| 2,739,069 | A   | 3/1956  | Fordyce et al.          |
| 2,739,070 | A   | 3/1956  | Fordyce et al.          |
| 3,502,765 | A * | 3/1970  | Spencer ........ 264/230 |
| 5,503,792 | A * | 4/1996  | Kawamura et al. ... 264/284 |
| 2005/0012239 | A1* | 1/2005 | Nakashima ........ 264/216 |
| 2008/0246189 | A1* | 10/2008 | Kuzuhara et al. ...... 264/334 |

FOREIGN PATENT DOCUMENTS

| GB | 2040792    | A   | *  | 9/1980  |
|----|------------|-----|----|---------|
| JP | 61114467   | A   | *  | 6/1986  |
| JP | 11-235728  | A   |    | 8/1999  |
| JP | 2000-086031| A   |    | 3/2000  |
| JP | 2002255409 | A   | *  | 9/2002  |
| JP | 2003-019726| A   |    | 1/2003  |
| JP | 2003175522 | A   | *  | 6/2003  |
| JP | 2003294944 | A   | *  | 10/2003 |

OTHER PUBLICATIONS

English machine translation of JP 2003-394944, provided by JPO, retrieved Oct. 16, 2009.*

* cited by examiner

*Primary Examiner*—Joseph S Del Sole
*Assistant Examiner*—Timothy Kennedy
(74) *Attorney, Agent, or Firm*—Frishauf, Holtz, Goodman & Chick, P.C.

(57) ABSTRACT

An optical film manufacturing method, comprising steps of: forming a film by casting a liquid-state resin; embossing both ends of the formed film in a lateral direction of the film so as to form embossed sections for conveying the film; conveying the film having the embossed sections by a freely rotatable conveyance roller; trimming and removing the embossed sections of the film after the conveying step; and winding up the film.

16 Claims, 1 Drawing Sheet

OPTICAL FILM MANUFACTURING METHOD AND APPARATUS

This application is based on Japanese Patent Application No. 2005-345694 filed on Nov. 30, 2005, the entire content of which is hereby incorporated by reference.

BACKGROUND OF THE INVENTION

The present invention relates to a method and apparatus for manufacturing the optical film that can be used as a film having various functions including a polarizing plate protective film, retardation film and film for expanded angle of field used in a liquid crystal display apparatus (LCD), and an antireflection film used in a plasma display, as well as the film having various functions used in an organic electroluminescent display.

BACKGROUND OF ART

A liquid crystal display apparatus has come into widespread use as a monitor because it is more space-saving and energy-saving than the conventional CRT display apparatus. It is also coming into widespread use as a TV monitor. The liquid crystal display apparatus having such characteristics employs various types of optical films such as a polarizing film and retardation film.

In recent years, the optical film has a wide range of uses in a thin display and others. Further, the thin display has come into use in a TV apparatus. The growing size of the TV apparatus requires a further increase in the size of the members thereof. The optical film used for a thin display is required to provide uniform optical characteristics and physical properties within the plane.

When manufacturing such an optical film using a solution-casting film manufacturing method, the solution formed by dissolving the resin in a solvent is cast on the metallic support member. Then the solvent is removed in the drying process and a film is wound, whereby the optical film is produced in the conventional art. When the melted liquid-casting manufacturing method is used, the resin is melted by heat, and the molten resin having been heated is subjected to melt extrusion using a die. Then a film is produced on a cooling roll and is wound after going through a conveyance process for reducing the film temperature. Both the solution-casting film formation method and melted liquid-casting film formation method use a tenter subsequent to film formation, in order to adjust the optical characteristics and flatness. In any case, when the film whose surface is still soft after film formation is conveyed by a conveyance roller, the mirror surface roll must be utilized to prevent the roll surface from being transferred. On the surface consisting of only the mirror surface, a slip is produced between the film and roll, and a scratch occurs, if the conveyance speed is increased or the film surface is hardened to become slippery. Such problems have been left unsolved in the conventional technique.

In the production of an optical film, the following Patent Documents regarding the conveyance of the film subsequent to film formation have been proposed to avoid such a trouble.

[Patent Document 1] Japanese Non-Examined Patent Publication 1999-235728

In the cellulose triacetate film manufacturing method, the Patent Document 1 describes the use of a roll characterized by enhanced control over a web or film as a conveyance roller. For example, a roll having a spiral groove or a roll with grooves provided on both ends is used as a conveyance roller (SPECIFICATION [0028] of Patent Document 1).

[Patent Document 2] Japanese Non-Examined Patent Publication 2000-86031

In a sheet-like conveyance apparatus, the Patent Document 2 proposes use of a grooved roll wherein both ends of the roll are provided with the portions having a greater traction (frictional force) with respect to a sheet-like object in contact with the roll surface.

[Patent Document 3] Japanese Non-Examined Patent Publication 2003-19726

In the cellulose ester film manufacturing apparatus, the Patent Document 3 proposes a method of avoid slipping of a film wherein the roll surface is provided with a portion of enhanced control in the direction of conveyance and a portion of reduced control in the direction of conveyance, and the area ratio thereof is determined.

In the conventional art described in the aforementioned Patent Documents 1 through 3, however, when the roll surface is grooved in order to provide a film conveyance roller with regulating force, and the film containing solvent or the film whose surface has been softened by heat is conveyed, the trace of the groove remains on the film. The trace must be removed by a slitter or the like. In this case, if the width of the film to be conveyed is changed, the roll groove position must be changed in conformity to the film width. This will require replacement of great number of rolls. This makes it difficult to produce the films of different widths in one and the same conveyance line. Such problems have been left unsolved in the conventional technique.

Further, a conveyance roller having groove shapes meeting the requirements of greater width is prepared. For example, a cellulose ester film of greater width is manufactured. When manufacturing a film of smaller width, a greater proportion of both ends along the width can be cut off. However, this method increases the loss of the material and reduces the efficiency. Such a problem has been left unsolved.

SUMMARY OF THE INVENTION

The object of the present invention is to solve the aforementioned problems and to provide an optical film manufacturing method wherein, without the surface of a conveyance roller per se being provided with processing required for the portion of strong regulating force as in the conventional method, the film can be conveyed by a freely rotatable conveyance roller with a mirror surface without the surface thereof being scratched or winkled. The aforementioned optical film manufacturing method is further characterized by the capability of handling an optical film of any width, a high conveyance speed, and improved optical film productivity.

The present inventors have made efforts to achieve the aforementioned object, and have found out the following: Without a portion with a greater regulating force as in the conventional method being provided on the conveyance roller to avoid slippery, a film can be conveyed by a freely rotatable conveyance roller with a mirror surface without its surface being scratched or wrinkled, if embossed sections for conveyance are provided on both ends of the film along the width. This finding has led them to the present invention.

In order to attain the above object, the invention described in Item 1 is an optical film manufacturing method, comprising steps of:

forming a film by casting a liquid-state resin;

embossing both ends of the formed film in a lateral direction of the film so as to form embossed sections for conveying the film;

conveying the film having the embossed sections by a freely rotatable conveyance roller;

trimming and removing the embossed sections of the film after the conveying step; and winding up the film.

The invention described in Item 2 is in the optical film manufacturing method of Item 1 that the embossing step is conducted on both obverse and reverse surfaces of the film so as to form obverse-side embossed sections having respective convexes projecting on both ends of the obverse surface and reverse-side embossed sections having respective convexes projecting on both ends of the reverse surface.

The invention described in Item 3 is in the optical film manufacturing method of Item 1 or Item 2 that the obverse-side embossed sections are formed on positions different from positions of the reverse-side embossed sections along the lateral direction of the film.

The invention described in Item 4 is in the optical film manufacturing method of any one of Items 1 to 3 that the sum of respective widths of the obverse-side embossed sections and the reverse-side embossed sections is from 20 mm to 100 mm.

The invention described in Item 5 is in the optical film manufacturing method of any one of Items 1 to 4 that the projecting convex is a hemi spherical convex whose apex is shaped in a gentle curve.

The invention described in Item 6 is in the optical film manufacturing method of any one of Items 1 to 5 that the projecting convex has a height of from 1 µm to 40 µm.

The invention described in Item 7 is in the optical film manufacturing method of any one of Items 1 to 6 that the conveyance roller has a conveyance surface to come in contact with the film and the conveyance surface is made in a mirror surface.

The invention described in Item 8 is in the optical film manufacturing method of Item 1 that the conveying step is adapted to convey the film in a drying process.

The invention described in Item 9 is in the optical film manufacturing method of Item 1 that after the film forming step, further comprising:

clipping both ends of the film and stretching the film in a lateral direction; and trimming and removing the clipped portions of the film; wherein after the steps of trimming and removing, the embossing step is conducted for both ends of the film in a lateral direction of the film to form the embossed sections for conveying the film.

The invention described in Item 10 is in the optical film manufacturing method of Item 1 that after the steps of trimming and removing the embossed sections of the film after the conveying step, further comprising:

embossing both ends of the film in a lateral direction of the film so as to form embossed sections for winding up the film.

The invention described in Item 11 is an optical film manufacturing apparatus, comprising:

a casting section for forming a film by casting a liquid-state resin;

an embossing section for embossing both ends of the film in a lateral direction of the film so as to form embossed sections for conveying the film;

a conveying section for conveying the film having the embossed sections by a freely rotatable conveyance roller;

a trimming section for trimming and removing the embossed sections of the film after conveying the film; and a winding section for winding up the film.

The invention described in Item 12 is in the optical film manufacturing apparatus of Item 11 that the embossing section conducts the embossing on both obverse and reverse surfaces of the film so as to form obverse-side embossed sections having respective convexes projecting on both ends of the obverse surface and reverse-side embossed sections having respective convexes projecting on both ends of the reverse surface.

The invention described in Item 13 is in the optical film manufacturing apparatus of Item 11 or Item 12 that the obverse-side embossed sections are formed on positions different from positions of the reverse-side embossed sections along the lateral direction of the film.

The invention described in Item 14 is in the optical film manufacturing apparatus of any one of Items 11 to 13 that the sum of respective widths of the obverse-side embossed sections and the reverse-side embossed sections is from 20 mm to 100 mm.

The invention described in Item 15 is in the optical film manufacturing apparatus of any one of Items 11 to 14 that further comprising:

a stretching section for clipping both ends of the film and stretching the film in a lateral direction, and a trimming section for trimming and removing the clipped portions of the film;

wherein after trimming and removing the clipped portions, the embossing section-conducts the embossing for both ends of the film in a lateral direction of the film to form the embossed sections for conveying the film.

The invention described in Item 16 is in the optical film manufacturing apparatus of any one of Items 11 to 15 that further comprising:

an embossing section for embossing both ends of the film in a lateral direction of the film so as to form embossed sections for winding up the film after trimming and removing the embossed sections for conveying the film.

The invention of the optical film manufacturing method in Item 1 includes:

a process of flow-casting a liquid state resin such as a resin solution or molten resin by the solution-casting film formation method or melted liquid-casting film formation method so as to form a film-like substance;

a process of forming an embossed section for film conveyance by embossing both ends of the formed film along the width, before a film conveyance process of conveying the film by a freely rotatable conveyance roller;

a process of using a freely rotatable conveyance roller to convey the film having embossed sections for conveyance on both ends along the width thereof;

a process of trimming and removing the embossed sections for conveyance of the film after conveyance; and a process of winding the film having embossed sections for winding on both ends along the width thereof.

The present invention provides the advantages wherein, without the surface of a conveyance roller per se being provided with processing required for the portion of strong regulating force, the film can be conveyed by a freely rotatable conveyance roller with a so-called mirror surface roll without the surface thereof being scratched or winkled. The present invention further provides the capability of handling an optical film of any width, a high conveyance speed, and improved optical film productivity.

The invention in Item 2 is that embossing for film conveyance is provided on both the obverse and reverse surfaces of the film. To be more specific, a obverse embossed section having a convex projecting on the obverse side and a reverse embossed section having a convex projecting on the reverse side are formed on both ends of the film along the width. If embossing for film conveyance is provided only on one of the obverse and reverse sides of the film, regulating force will be applied to only the conveyance roller in contact with the processed surface, without regulating force being applied to the conveyance roller in contact with the unprocessed surface. In the present invention, however, as described above, regulating force is applied to the conveyance roller in contact with the embossed sections on the obverse and reverse surfaces of the film. Without the surface of a conveyance roller per se being provided with processing required for the portion of strong regulating force, the film can be conveyed at a high speed by a so-called mirror surface roll, without the surface thereof being scratched or winkled. Moreover, this arrangement provides the capability of handling an optical film of any width.

The invention in Item 3 is that the embossed sections for conveyance provided on the obverse sides of both ends of the film along the width and those on the reverse sides along the width of the film are formed in staggered configuration with respect to each other. This arrangement ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

The invention in Item 4 is that the embossed sections for film conveyance formed on both ends of the film along the width each have a width of 20 through 100 mm in terms of the total of the embossed section for conveyance on the obverse side and that on the reverse side, from both ends of the film along the width. If the width of the embossed section for film conveyance is excessive, the regulating force for the roll can be increased, but the area of the portion of greater regulating force will be excessive. This will cause wrinkles to occur to the portion of greater regulating force, and the film may break. In the present invention, the width of the embossed section for film conveyance formed on both ends of the film along the width is kept within the aforementioned range. This arrangement ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

The invention in any of Items 5 to 7 is that the shape of the embossed sections for film conveyance is made in a respective characterized shape. Accordingly, the film can be conveyed by a so-called mirror surface roll, without causing the surface of the optical film being scratched or winkled. Moreover, this arrangement provides the capability of handling an optical film of any width, as well as high-speed conveyance.

The invention in Item 8 is that the film having embossed sections on its both ends in a lateral direction is conveyed in a drying process by a freely rotatable conveyance roller. Accordingly, even if the drying process is conducted under a high temperature, the film can be conveyed by a so-called mirror surface roll, without causing the surface of the optical film being scratched or winkled.

The invention of the optical film manufacturing method in Item 9 is that further including the steps of: orienting the film along the width by a tenter subsequent to the film forming process; trimming and removing the clipped portions on both ends of the film along the width due to an stretching apparatus after stretching; and embossing both ends of the stretched film along the width, thereby forming the embossed section for film for conveyance. If both ends of the film along the width are provided with embossing before stretching by the tenter, the embossed section may be broken by subsequent stretching, or the clipping portion on both ends of the film and the embossed section may be overlapped with each other due to the tenter, with the result that the embossed section is broken. In the present invention, the clipping portion on both ends of the film is removed by the slitter after stretching by the tenter. After that, both ends of the film are embossed for conveyance. This arrangement ensures that, without the portion of strong regulating force being provided on the surface of a conveyance roller, the film can be conveyed by a so-called mirror surface roll, without the surface of the film being scratched or winkled. This arrangement further provides the capability of handling an optical film of any width, and a high conveyance speed.

The invention of the optical film manufacturing method in Item 10 is that after the process of removing the conveyance-use embossed sections and before the process of winding up the film, wind-up embossed sections having a height necessary for winding up the film are provided on both ends of the film in a lateral direction. Therefore, when winding up the film, troubles such as bad influences or failures caused on surface condition of the film by entire contact or partial contact between wound-up films can be avoided.

The invention of the optical film manufacturing apparatus in Item 11 includes:

a casting apparatus for flow-casting a resin solution or molten resin by the solution-casting film formation method or melted liquid-casting film formation method so as to form a film-like substance;

an embossed section forming apparatus for forming an embossed section for film conveyance by embossing both ends of the formed film along the width, before a film conveyance apparatus for conveying the film by a freely rotatable conveyance roller;

a conveyance apparatus for using a freely rotatable conveyance roller to convey the film having embossed sections for conveyance on both ends along the width thereof;

a trimming apparatus for trimming and removing the embossed sections for conveyance of the film after conveyance;

an embossed section forming apparatus for forming film winding embossed sections on both ends of the film along the width by forming an emboss having the height required to wind the film; and a winding apparatus for winding the film having embossed sections for winding on both ends along the width thereof.

The present invention provides the advantages wherein, without the surface of a conveyance roller per se being provided with processing required for the portion of strong regulating force, the film can be conveyed by a freely rotatable conveyance roller with a so-called mirror surface roll without the surface thereof being scratched or winkled. The present invention further provides the capability of handling an optical film of any width, a high conveyance speed, and improved optical film productivity.

The invention in Item 12 is that, further provided with a film stretching apparatus (tenter) for orientating the film having been formed by the casting apparatus along the width. This optical film manufacturing apparatus includes the steps of orienting the film along the width by the tenter subsequent to the film forming process; trimming and removing the clipped portions on both ends of the film along the width due to the stretching apparatus by using a trimming apparatus after stretching; and embossing both ends of the stretched film along the width by the embossed section forming apparatus, thereby forming the bossed section for film for conveyance. If both ends of the film along the width are provided with embossing before stretching by the tenter, the embossed section may be broken by subsequent stretching, or the clipping portion on both ends of the film and the embossed section may be overlapped with each other due to the tenter, with the result that the embossed section is broken. In the present invention, the clipping portion on both ends of the film is removed by the slitter after stretching by the tenter. After that, both ends of the film are embossed for conveyance. This arrangement ensures that, without the portion of strong regulating force being provided on the surface of a conveyance roller, the film can be conveyed by a so-called mirror surface roll, without the surface of the film being scratched or winkled. This arrangement further provides the capability of handling an optical film of any width, and a high conveyance speed.

The invention in Item 13 is that an embossed section forming section forms a obverse embossed section having a convex projecting on the obverse side and a reverse side embossed section having a convex projecting on the reverse side on both ends of the film along the width. If embossing for film conveyance is provided only on one of the obverse and reverse sides of the film, regulating force will be applied to only the conveyance roller in contact with the processed surface, without regulating force being applied to the conveyance roller in contact with the unprocessed surface. In the present invention, however, as described above, regulating force is applied to the conveyance roller in contact with the embossed sections on the obverse and reverse surfaces of the film. Without the surface of a conveyance roller per se being provided with processing required for the portion of strong regulating force, the film can be conveyed at a high speed by a so-called mirror surface roll, without the surface thereof being scratched or winkled. Moreover, this arrangement provides the capability of handling an optical film of any width.

The invention in Item 14 is that the embossed sections for conveyance provided on the obverse sides of both ends of the film along the width and those on the reverse sides are formed in staggered configuration with respect to each other by the embossed section forming apparatus for film conveyance. This arrangement ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

The invention in Item 15 is that the embosses section forming section for film conveyance forms the embossed sections for film conveyance on both ends of the film along the width, and each of these sections has a width of 20 through 100 mm in terms of the total of the embossed section for conveyance on the obverse side and that on the reverse side, from both ends of the film along the width. If the width of the embossed section for film conveyance is excessive, the regulating force for the roll can be increased, but the area of the portion of greater regulating force will be excessive. This will cause wrinkles to occur to the portion of greater regulating force, and the film may break. In the present invention, the width of the embossed section for film conveyance formed on both ends of the film along the width is kept within the aforementioned range. This arrangement ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

The invention in Item 16 is that further comprising an embossed section forming section to form wind-up embossed sections having a height necessary for winding up the film on both ends of the film in a lateral direction after the process of removing the conveyance-use embossed sections and before the process of winding up the film. Therefore, when winding up the film, troubles such as bad influences or failures caused on surface condition of the film by entire contact or partial contact between wound-up films can be avoided.

DETAILED DESCRIPTION OF THE PREFERRED EMBODIMENT

Figure 1:
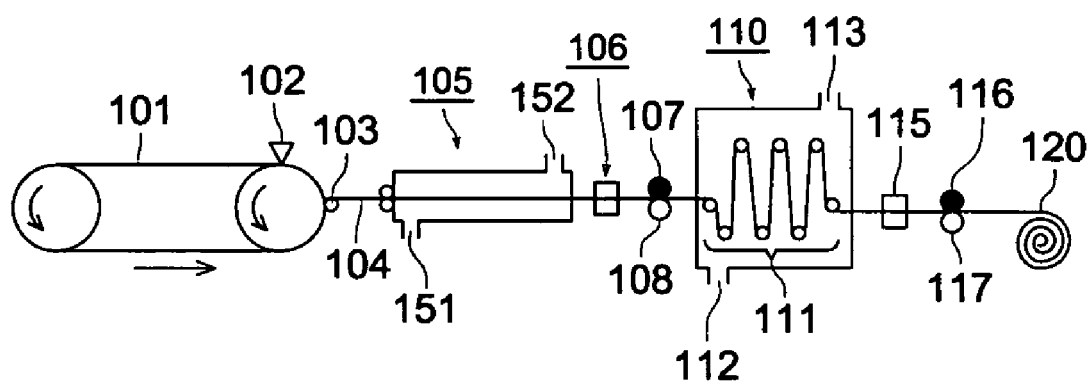
FIG. 1 is a schematic view of a manufacturing apparatus for a cellulose ester type resin film according to the present invention.

The following describes the embodiments of the present invention without the present invention being restricted thereto.

The present invention relates particularly to an optical film manufacturing method applicable to a polarizing plate protective film of a liquid crystal display apparatus (LCD) and others.

The optical film manufacturing method according to the preferred embodiment of the present invention includes:

a process of flow-casting a resin solution or molten resin to form a film-like substance;

a process of forming an embossed section for film conveyance by embossing both ends of the formed film along the width, before a film conveyance process of conveying the film by a freely rotatable conveyance roller (a free roll that is not driven by a drive source);

a process of using a freely rotatable conveyance roller (a free roll that is not driven by a drive source) to convey the film having embossed sections for conveyance on both ends along the width thereof;

a process of trimming and removing the embossed sections for conveyance of the film after conveyance;

a process of forming film winding embossed sections on both ends of the film along the width by forming an emboss having the height required to wind the film; and a process of winding the film having embossed sections for winding on both ends along the width thereof. Either the solution-casting film formation method or melted liquid-casting film formation method can be used for the optical film manufacturing method of the present invention.

No restriction is imposed on the resin used in the method of the present invention. The preferably used resin can be exemplified by the cellulose ester based resin having an acyl group replacement ratio of 1.8 through 2.80 such as cellulose acetate, cellulose acetate propionate and cellulose acetate butylate; and the cellulose ether resin having an alkyl group replacement ratio of 2.0 through 2.80 such as cellulose methyl ether, cellulose ethyl ether and cellulose propyl ether.

When cellulose triacetate is used, it is preferred to have a degree of polymerization of 250 through 400, and the amount of combined acetic acid ranging from 54 through 62.5%. The amount of combined acetic acid ranging from 58 through 62.5% is more preferred because the base strength is superior. Either cellulose triacetate synthesized from cotton linter or cellulose triacetate synthesized from wood pulp can be used singly as the cellulose triacetate. Alternatively, their mixture can be mixed as such.

The cellulose triacetate made of the cotton linter characterized by excellent separability from the belt or drum is preferably used in greater amount because production efficiency is improved. If the proportion of the cellulose triacetate made of cotton linter exceeds 60 wt %, the separation advantage is improved. Accordingly, this is preferred. More preferably, the proportion should exceed 85 wt %. Use of the cellulose triacetate alone is most preferred.

Other resins used in the method of the present invention are cycloolefin resin, norbornane based resin, polycarbonate resin, polyamide resin as a polymer of alkylene dicarboxylic acid and diamine, polymer of alkylene dicarboxylic acid and diol, polymer of alkylene diol and dicarboxylic acid, polymer of cyclohexanedicarboxylic acid and diol, polymer of cyclohexane diol and dicarboxylic acid, polyester resin such as polymer of aromatic dicarboxylic acid and diol, vinyl acetate resin such as polyvinyl acetate and vinyl acetate copolymer, polyvinyl acetal resin such as polyvinyl acetal and polyvinyl butyral, epoxy resin, ketone resin, and polyurethane resin including the linear polymer such as alkylene diisocyanate and alkylene diol. At least one of the aforementioned substances is preferably contained.

Among them, the cellulose ester based resin such as cellulose acetate, cellulose triacetate, cellulose acetate propionate and cellulose acetate butylate, cycloolefin resin, norbornane based resin and polycarbonate resin is particularly preferred. Further, two or more compatible polymers can be blended and can be subjected to dope dissolution to be described later. However, the present invention is not restricted to them.

The following describes the optical film manufacturing method of the present invention to be practiced based on the solution-casting film formation method.

The following describes the present invention with reference to a cellulose ester based resin.

The material used to form a film in the optical film manufacturing method of the present invention includes a plasticizer, ultraviolet absorber and matting agent in addition to the cellulose ester based resin and solvent.

There is no restriction to the plasticizer that can be used in the present invention. The preferably used phosphoric acid ester as the plasticizer is exemplified by triphenyl phosphate, tricresyl phosphate, cresyl diphenyl phosphate, octyldiphenyl phosphate, diphenylbiphenyl phosphate, trioctyl phosphate and tributyl phosphate. The preferably used phthalic acid ester is exemplified by diethyl phthalate, dimethoxy ethyl phthalate, dimethyl phthalate, dioctyl phthalate, dibutyl phthalate and di-2-ethylhexyl phthalate. The preferably used glycolic acid ester is exemplified by triacetin, tributyrin, butyl phthalylbutyl glycolate, ethyl phthalylethyl glycolate, methylphthalyl ethylglycolate, and butylphthalylbutyl glycolate.

Two or more aforementioned plasticizers can be used if required. In this case, the proportion of the phosphoric acid ester based plasticizer used should be kept not to exceed 50%. This is effective in minimizing hydrolysis of the cellulose ester based resin film and in maintaining superb durability.

It is more preferred to reduce the proportion of the phosphoric acid ester based plasticizer used. Use of only the phthalic acid ester based plasticizer or glycolic acid ester based plasticizer is particularly preferred.

In the present invention, to keep the percentage of water absorption and moisture regain within a predetermined range, the amount of the plasticizer to be added is preferably 3 through 30 wt % with respect to the cellulose ester based resin, more preferably 10 through 25 wt % and still more preferably 15 through 25 wt %. In this case, if the amount of the plasticizer added has exceeded 30 wt %, the mechanical strength and dimensional stability of the cellulose ester based resin film will be reduced. This is not preferred.

A hindered phenol based compound is preferably used as an antioxidant. This is exemplified by 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexane diol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thiodiethylene bis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene and tris-(3,5-di-t-butyl-4-hydroxybenzyl)-isocyanurate. In particular, use of 2,6-di-t-butyl-p-cresol, pentaerythrityl-tetrakis[3-(3,5-di-t-butyl-4-hydroxyphenyl)propionate] and triethylene glycol-bis[3-(3-t-butyl-5-methyl-4-hydroxyphenyl)propionate] is preferred. The hydrazine based metal deactivating agent such as N,N'-bis[3-(3,5-di-t-butyl-4-hydroxyphenyl)propionyl]hydrazine, and the phosphoric acid based processing stabilizer such as tris(2,4-di-t-butylphenyl)phosphite can be used in combination. To ensure the advantages thereof, the preferred amount of these compounds to be added is 1 ppm through 1.0% in terms of weight percentage with respect to the cellulose ester based resin, and more preferred amount is 10 through 1000 ppm.

In the present invention, an ultraviolet absorber is preferably added to the cellulose ester based resin film. In this case, the preferably used ultraviolet absorber should be characterized by an excellent capacity to absorb the ultraviolet rays having a wavelength of 370 nm or less in order to prevent the liquid crystal from deteriorating, and by the minimum possible absorption of the visible light having a wavelength of 400 nm or more in order to ensure superb liquid crystal display performances.

In the present invention, particularly the transmittance of ultraviolet rays having a wavelength of 370 nm should be 10% or less. It is preferably 5% or less, more preferably 2% or less.

The ultraviolet absorber to be used in the present invention is exemplified by oxybenzophenone based compound, benzotriazole based compound, salicylic acid ester based compound, benzophenone based compound, cyanoacrylate based compound and nickel complex salt compound, without the present invention being restricted thereto.

In the present invention, one or more of the aforementioned ultraviolet absorbers are preferably used. Two or more ultraviolet absorbers of different types can also be contained.

The ultraviolet absorber preferably used in the present invention is exemplified by a benzotriazole based ultraviolet absorber and a benzophenone based ultraviolet absorber. It is particularly preferred that the benzotriazole based ultraviolet absorber characterized by the minimum coloring should be added to the cellulose ester based resin film.

The ultraviolet absorber can be added by the steps of dissolving ultraviolet absorber into such an organic solvent as alcohol, methylene chloride and dioxolane, and adding the mixture to dope, or by the step of directly adding it into the dope composition. The inorganic powder and others that are not dissolved in the organic solvent are added to the dope after having been dispersed in the organic solvent and cellulose ester based resin by a dissolver or sandmill.

The amount of the ultraviolet absorber used in the present invention is 0.1 through 2.5 wt % with respect to the cellulose ester based resin, preferably 0.5 through 2.0 wt %, more preferably 0.8 through 2.0 wt %. If the amount of the ultraviolet absorber used has exceeded 2.5 wt %, the transparency of the cellulose ester based resin film tends to decrease. This is not preferred.

Further, fine particles as a matting agent may be added to the cellulose ester based resin film in order to prevent a film from being sticking to another or to provide sliding property for easy handling.

The fine particle can be either an inorganic compound or an organic compound. The fine particle of inorganic compound is exemplified by that made of silicon dioxide, titanium dioxide, aluminum oxide, zirconium oxide or tin oxide. Among them, the compound containing a silicon atom is preferably used. Especially, use of silicon dioxide fine particles is preferred. The silicon dioxide fine particle is exemplified by the AEROSIL-200, 200V, 300, R972, R972V, R974, R976, R976S, R202, R812, R805, OX50, TT600, RY50, RX50, NY50, NAX50, NA50H, NA50Y, NX90, RY200S, RY200, RX200, R8200, RA200H, RA200HS, NA200Y, R816, R104, RY300, RX300 and R106 manufactured by Nippon Aerosil Co., Ltd. Of these, AEROSIL-200V or R972V is preferred for the dispersibility and controllability of the particle size.

The average size of the fine particle in the film is preferably 50 nm through 2 μm, more preferably 100 nm through 1000 nm, still more preferably 100 nm through 500 nm for the purpose of ensuring excellent sliding property and transparency. The average particle size in the film can be checked by observation of along sectional photo.

Thereversee often differences among the primary size of the fine particle, the size subsequent to dispersion in the solvent, and the size having been added to the film. It is important to control the size of the particles formed by coagulation with the cellulose ester based resin in the film in the final phase.

The amount of the fine particle to be added is preferably 0.02 through 0.5 wt % with respect to the cellulose ester based resin film, more preferably 0.04 through 0.3 wt %.

Fine particles are dispersed by the step of using a high pressure dispersion apparatus to process the composition formed by mixing the fine particle with solvent. The high pressure dispersion apparatus used for dispersion can be a high pressure dispersion apparatus capable of creating special conditions such as high shearing and high pressure conditions when the composition formed by mixing the fine particle with solvent is passed through a tubule at a high speed. For processing with the high pressure dispersion apparatus, the maximum pressure condition in the apparatus is preferably 100 kfg/cm$^2$ or more in a tubule having a diameter of 1 through 2000 μm, more preferably 200 kfg/cm$^2$ or more. In this case, the maximum speed achieved is preferably 100 m/sec. or more, and heat transmission speed is preferably 100 kcal/hr. or more. The aforementioned high pressure dispersion apparatus is exemplified by a super-high pressure homogenizer (Microfluidizer by trade name) manufactured by Microfluidics Corporation or a nanomizer manufactured by Nanomizer Corporation. Further, Manton-Gaulin type high pressure dispersion apparatus, e.g. a homogenizer manufactured by Izumi Hood Machinery can also be mentioned.

The fine particle used in the present invention is dispersed in the solvent containing 25 through 100 wt % of water soluble solvent. After that, water-insoluble organic solvent is added to the water soluble solvent so that water soluble solvent is diluted in water-insoluble organic solvent to a ratio of 1 to 0.5 through 1.5. This is mixed with the dope formed by dissolving the cellulose ester based resin in the solvent. This mixture is flow-cast on the supporting member, and a film is formed by drying. In this manner, a cellulose ester based resin film is obtained.

In this case, a lower alcohol is mainly used as the water soluble solvent. The lower alcohols are exemplified by methyl alcohol, ethyl alcohol, propyl alcohol, isopropyl alcohol and butyl alcohol, which are preferably employed.

No restriction is imposed on the water insoluble solvent in the present invention. The solvent used at this time producing the cellulose ester based resin is preferably utilized. In this case, the solubility in water should be 30 wt % or less. This water insoluble solvent is exemplified by methylene chloride, chloroform and methyl acetate.

The concentration of fine particles dispersed in the solvent is 1 through 30 wt %. If the concentration exceeds this range, there will be a rapid increase in viscosity.

This is not preferred. The concentration of fine particles in the dispersion liquid is preferably 5 through 25 wt %, more preferably 10 through 20 wt %.

The haze of the cellulose ester based resin film can be measured for example, by an ASTM-D1003-52. The haze is preferably 0 through 0.6%, more preferably 0 through 0.4%, still more preferably, 0.1 through 0.2%.

In the present invention, the solvent of cellulose ester based resin is exemplified by lower alcohols such as methanol, ethanol, n-propyl alcohol, iso-propyl alcohol and n-butanol, cyclohexane dioxanes, and chlorides of such lower aliphatic hydrocarbon as a methylene chloride.

The proportion of the solvent is determined in such a way that the methylene chloride is preferably 70 through 95 wt % and other solvents are preferably 30 through 5 wt %. The concentration of the cellulose ester based resin in dope is preferably 10 through 50 wt %. The heating temperature subsequent to addition of the solvent is preferably equal to or greater than the boiling temperature of the solvent used, without the solvent boiling. For example, it is preferably set at 60° C. or more, more preferably at 80 through 110° C. The pressure should be set at such a level that the solvent does not boil at the preset temperature.

After dissolution, while the dope of the cellulose ester based resin is cooled, the mixture is taken out of the container (melting vessel) or is taken out of the container by a pump. Then it is cooled by a heat exchanger or the like, whereby a film is formed.

The general description of the optical film manufacturing method based on the solution-casting film formation method is given in the U.S. Pat. No. 2,492,978, U.S. Pat. No. 2,739,070, U.S. Pat. No. 2,739,069, U.S. Pat. No. 2,492,977, U.S. Pat. No. 2,336,310, U.S. Pat. No. 2,367,603, U.S. Pat. No. 2,607,704, U.K. Patent No. 64,071, U.K. Patent No. 735,892, Japanese Non-Examined Patent Publication (Tokkosho) 45-9074, Japanese Non-Examined Patent Publication (Tokkosho) 49-4554, Japanese Non-Examined Patent Publication (Tokkosho) 49-5614, Japanese Non-Examined Patent Publication (Tokkosho) 60-27562, Japanese Non-Examined Patent Publication (Tokkosho) 61-39890, and Japanese Non-Examined Patent Publication (Tokkosho) 62-4208.

The optical film manufacturing method of the present invention contains a dope preparation process, casting process, drying process and winding process.

FIG. 1 is a schematic view of a manufacturing apparatus to conduct the above optical film manufacturing method. In a dope preparing process, a cellulose ester type resin is prepared into a liquid state dope. The dope is cast onto a support 101 by a casting die 102, and a film 104 is separated from the support 101 by a separating roller 103. The separated film 104 is held at its both ends along the lateral direction and is stretched by a stretching section 105. In the stretching section 105, a dry air with a controlled temperature is brown from an a dry air inlet 151 and discharged from an dry air outlet 152. Subsequently, the clipped portions at the ends of the film 104 is trimmed and removed by a trimming section 106, thereafter, predetermined embossed sections for conveying the film 104 are formed on the film 104 by a heated embossing roller 107 and a back roller 108 opposite to the embossing roller 107. The film 104 provided with the embossed sections are conveyed in a drying section 110 by conveying rollers 111. In the drying section 110, a dry air with a controlled temperature is brown from an a dry air inlet 171 and discharged from an dry air outlet 172. The conveyance-use embossed sections at the ends of the dried film 104 is trimmed and removed by a trimming section 115, and then, embossed sections for winding up the film 104 are formed on the film 104 by a heated embossing roller 116 and a back roller 117 opposite to the embossing roller 116 and the film 104 is wound up around a winding-up roller 120.

Hereinafter, the above manufacturing method is explained in detail.

The dope containing the cellulose derivative is prepared by stirring and dissolving the cellulose ester based resin into the organic solvent mainly made up of the good solvent for the cellulose ester based resin, in a melting vessel 1.

The cellulose ester based resin can be dissolved in various ways: For example, it can be dissolved at the normal pressure, at or below the boiling point of the main solvent, or at or above the boiling point of the main solvent. Alternatively, it can be dissolved according to the cooling dissolution method disclosed in the Japanese Non-Examined Patent Publication 1997-95544, Japanese Non-Examined Patent Publication 1997-95557 and Japanese Non-Examined Patent Publication 1997-95538. It can be dissolved at a high pressure as disclosed in the Japanese Non-Examined Patent Publication 1999-21379. Of these, the method of applying pressure at or above the boiling point of the main solvent is preferably used.

The heating temperature subsequent to addition of the solvent is preferably equal to or greater than the boiling temperature of the solvent used, without the solvent boiling. For example, it is preferably set at 60° C. or more, more preferably at 80 through 110° C. The pressure should be set at such a level that the solvent does not boil at the preset temperature. The concentration of the cellulose ester based resin in the dope is preferably 10 through 35 wt %.

The additives such as a plasticizer, ultraviolet absorber and matting agent required in addition to the cellulose ester based resin and solvent are mixed with the solvent in advance and are dissolved or dispersed. Then these additives can be added to the solvent before dissolution of the cellulose ester based resin. Alternatively, these additives can be added after dissolution of the cellulose ester based resin.

No restriction is imposed on the type of the melting vessel (pressure container) to be used. The melting vessel is only required to withstand a predetermined pressure and to permit heating and agitation under pressure. The pressure container is further equipped with such an instrument as a pressure gauge and thermometer as required. When pressure is applied, pressurized inert gas such as nitrogen gas can be used. It is also possible to use the rise of the steam pressure of the solvent resulting from heating. Heating is preferably provided from the outside. For example, a jacket type is preferably used because of easy temperature control.

In the present invention, the amount of foreign substances contained in the cellulose ester based resin film is preferably minimized. The foreign substances include those that can be identified in the polarizing crossed-Nicols state, and those made up of the coagula of fine particles projecting from the film surface.

The foreign substances that can be identified in the polarizing crossed-Nicols state are measured by placing two polarizing plates perpendicular to each other (in the crossed-Nicols state), and putting a cellulose ester based resin film between them. When these foreign substances in the state of polarizing crossed-Nicols are placed in the dark field, only the foreign substances illuminate to emit enough light to be observed. This ensures easy identification of the size and number of the substances.

No restriction is imposed on the method of getting a cellulose ester based resin film containing the minimum amount of the aforementioned foreign substances. It can be obtained by using the following filter paper to filter the dope composition obtained by dissolving the cellulose ester based resin in the solvent. In this case, the filter paper having a water filtering time of 20 sec. or more is preferably used, and a film is formed preferably by filtering at a filtering pressure of 16 kg/cm$^2$ or less. More preferably, filter paper having a filtering time of 30 sec. or more is used to perform filtering at a filtering pressure of 12 kg/cm$^2$ or less. Still more preferably, filter paper having a filtering time of 40 sec. or more is used to perform filtering at a filtering pressure of 10 kg/cm$^2$ or less. Further, use of two sheets of aforementioned filter paper placed on top of the other is more preferred. The filtering pressure can be controlled by adequate selection of a filtering flow rate and filtering area.

In the present invention, the casting dope prepared according to the aforementioned procedure is flow-cast on the supporting member by a casting die.

A pressure die is preferably used as the casting die 102, since a slit on the inlet of the pressure die can be adjusted and film thickness can be easily made uniform. The pressure die, for example, includes a coat hanger die and a T-die, which are preferably utilized. Further, the rotary drive belt or the drum of stainless steel having undergone a process of mirror surface finished is used as the supporting member in the casting process. The casting process can be implemented when the temperature of the supporting member 101 is in the general temperature range from 0° C. through the temperature below boiling point of the solvent. Casting on the supporting member of 5 through 30° C. is preferred since it is possible to gelatinize the dope and to improve the separation critical time. Casting on the supporting member of 5 through 15° C. is more preferred. The separation critical time in the sense in which it is used here refers to the duration of time when the dope having been cast is present on the supporting member at the limit of the casting speed wherein transparent, flat and high-quality films can be obtained on a continuous basis. A shorter separation critical time signifies better productivity.

In the drying process of the supporting member 101, the dope having been cast is gelatinized once. The time from casting to the separation by a separation roll is assumed as 100%. In this case, the dope temperature is adjusted to 40 through 70° C. within 30% from casting. This accelerates evaporation of the solvent, ensures earlier separation from the supporting member, and increases the separation strength. Therefore, the dope temperature is adjusted 55 through 70° C. within 30% or less. After that, this temperature is preferably maintained for 20% or more. Further, this temperature is more preferably maintained for 40% or more.

For drying on the supporting member 101, separation from the supporting member by the separation roll is preferred when the amount of residual solvent is 60 through 150%, because the strength of separation from the supporting member can be reduced. This separation is more preferred when the amount of residual solvent is 80 through 120%. The dope temperature at this time separation is preferably kept at 0 through 30° C. This increases the basic strength at the time of separation, and avoids basic breakdown at the time of separation. The dope temperature is more preferably kept at 5° C. through 20° C.

In the production of a cellulose ester film according to the solution-casting film formation method, the amount of the residual solvent is expressed by the following formula:

Amount of residual solvent (wt %)=$\{(M-N)/N\} \times 100$ where M denotes the weight of the web (film) at a given time, and N indicates the film weight when the weight M is heated to 115° C. for one hour.

In the film drying process, the film having been separated by the separation roll 103 is further dried by the supporting member. Normally, after separation, the film is dried by a tenter apparatus and/or a drying apparatus, wherein the tenter apparatus which conveys the film (web) having been separated, by holding both ends of the film along the width with a clip or pin, and the film is alternately conveyed by being passed through a plurality of conveyance rollers placed in the drying apparatus. For the liquid crystal display member, the method of drying by retaining the width according to the tenter arrangement is preferred to improve the dimensional stability. In particular, the width is preferably retained immediately after separation of the supporting member where there is a great amount of residual solvent. This is effective in improving the dimensional stability.

Especially in the drying process subsequent to separation from the supporting member, the film (web) tends to shrink along the width due to the evaporation of the solvent. Drying at a higher temperature brings about greater shrinkage. Drying by minimizing this shrinkage is preferred in improving the flatness of the finished film. In this respect, the tenter method is preferred, wherein drying is performed while both ends of the film along the width are held by clips in the entire drying process or a part thereof so that the width is retained. This is disclosed in the Japanese Non-Examined Patent Publication 1986-46625.

There is no restriction to the means by which the film is dried. Generally, hot air, infrared ray, heating roll or microwave is used. Because of simplicity, use of hot air is preferred. The drying temperature is divided into 3 through 5 classes within the range from 40 through 150° C. It is preferred that this should be gradually increased. It is more preferred that drying should be performed within the range from 80 through 140° C. to improve the dimensional stability.

In the optical film manufacturing method of the present invention, embossing is provided on both ends of the separated and formed film along by an embossing roller 107 the width before the film conveyance process for conveyance by a freely rotatable conveyance roller 111 (a free roll not driven by the drive source), whereby an embossed section for film conveyance is formed.

The number of the freely rotatable conveyance rollers (free rolls not driven by the drive source) used in the film conveyance process is normally of the order of 200 through 800, although it depends on the length of the optical film to be produced. Not only the conveyance roller but also the conveyance belt can be used as the freely rotating conveyance member used in the film conveyance process.

Not all freely rotatable conveyance rollers are used from the film conveyance process to the winding process. One through several conveyance drive rolls (drive rolls driven by the drive source) must be installed. Basically, the conveyance drive roll is intended to drive the film by the driving power. A mechanism is provided to synchronize the film conveyance by nipping or suction (by air) with the rotation of the drive roll. Conveyance embossing on the film of the present invention does not hinder film conveyance by this drive roll. However, for example, if the film remaining method (mechanism for synchronization) by the conveyance drive roll is based on the nipping technique, the embossed section for conveyance on both ends of the film along the width may be crushed. In the present invention, suction method is preferably used to remain the film by the conveyance drive roll.

In the present invention, if the process of performing the aforementioned processing by the aforementioned tenter is included immediately after the film forming process, embossing is preferably provided after the processing by a tenter. To be more specific, in the method of the present invention, the film is stretched along the width by the tenter in the stretching section 105. Subsequent to stretching, the clipped portion on both ends of the film along the width is trimmed off by the trimming section 106. After that, embossing is provided on both ends of the film along the width. Then the embossed section for film conveyance is formed.

This is because of the following reason: If embossing is provided on both ends of the film along the width prior to stretching by the tenter, the embossed section may be burst by a subsequent stretching, or the clipping portion and embossed section on both ends of the film by the tenter may be placed on top of the other. This may cause the overlapped portion to be broken.

To prevent this, in the present invention, the clipping portion on both ends of the film is removed by a slitter subsequent to stretching by a tenter. After that, embossing for conveyance is provided on both ends of the film. Without the surface of the conveyance roller being provided with processing required for the portion of strong regulating force, the film can be conveyed by a so-called mirror surface roll without the surface of the optical film being scratched or winkled. Thus, this method of the present invention is characterized by the capability of handling an optical film of any width at a high conveyance speed.

The embossing process is preferably located on the farthest upstream position wherever possible. However, in the solution-casting film formation method, if the film contains an excessive amount of the residual solvent, the film may be broken at the time of embossing. Thus, the amount of the residual solvent in the film is preferably 50 wt % or less. If the amount of the residual solvent in the film exceeds 50 wt %, the film surface is soft and regulating force still works on the conveyance roller. This does not require embossing.

Figure 2:
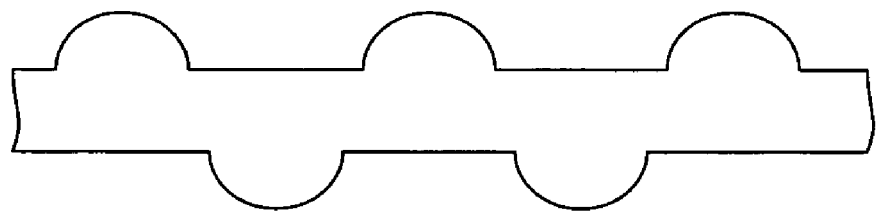
FIG. 2 is a sectional view of embossed sections formed on a film for conveying a film according to the present invention.

As shown in FIG. 2, in order to provide a proper regulating force (holding force) to a mirror surface roller even when a film conveyance is conducted by the mirror surface roller, an embossing convex for film conveyance is shaped in a hemi spherical convex whose apex is shaped in a gentle curve.

In the present invention, embossing for film conveyance is provided on both the obverse and reverse surfaces of the film, and a obverse embossed section having a convex projecting on the obverse side and a reverse embossed section having a convex projecting on the reverse side be formed preferably on both ends of the film along the width. If embossing for film conveyance is provided only on one of the obverse and reverse sides of the film, regulating force will be applied to only the conveyance roller in contact with the processed surface, without regulating force being applied to the conveyance roller in contact with the unprocessed surface. In the preferable embodiment of the present invention, however, as described above, regulating force is applied to the conveyance roller in contact with the embossed sections on the obverse and reverse surfaces of the film. Without the surface of a conveyance roller per se being provided with processing required for the portion of strong regulating force, the film can be conveyed at a high speed by a so-called mirror surface roll, without the surface thereof being scratched or winkled. Moreover, this arrangement provides the capability of handling an optical film of any width.

In the present invention, the embossed sections for conveyance provided on the obverse sides of both ends of the film along the width and those on the reverse sides along the width of the film are preferably formed in staggered configuration with respect to each other. To be more specific, it is preferred that the embossed sections for conveyance provided on the obverse sides and those on the reverse sides should not overlap. This arrangement ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

In the present invention, the embossed sections for film conveyance formed on both ends of the film along the width each have a width of 20 through 100 mm in terms of the total of the embossed section for conveyance on the obverse side and that on the reverse side, from both ends of the film along the width. If the width of the embossed section for film conveyance is excessive, the regulating force for the roll can be increased, but the area of the portion of greater regulating force will be excessive. This will cause wrinkles to occur to the portion of greater regulating force, and the film may break. In the present invention, if the width of the embossed sections for film conveyance formed on both ends of the film along the width is less than 20 mm, this is insufficient for a plurality of conveyance rollers to have regulating force. Even if there is regulating force in the initial phase of the film due to conveyance roller, the height of the embossing is reduced during the course of conveyance, with the result that the aforementioned width is insufficient for the conveyance roller to have regulating force. If the width of the embossed sections for film conveyance has exceeded 100 mm, the conveyance roller will have regulating force, but the area of the film portion of greater regulating force will be excessive. This will cause wrinkles to occur to the film portion of greater regulating force, and the film may break. This is not preferred.

Embossing is preferably provided at a position 0 through 100 mm away from both ends of the film along the width. There is no restriction to the form of embossing. The number of the starts of embossing processed at one position can be one, two or more.

The height of the projections and depression of embossing is preferably 1 through 40 μm, more preferably 2 through 35 μm, still more preferably 7 through 30 μm.

Normally, embossing can be formed when an emboss ring marked on the film is applied onto the back roll made of metal or rubber. It can be formed at the normal temperature, but is preferably formed at a temperature of Tg+20° C. or more, and at a melting point (Tm)+30° C. or less.

More concretely, if the embossing process is conducted at a temperature lower than the maximum temperature (highest temperature) applied to the film during the film conveyance, there is a fear that the embossing sections may be deformed during the film conveyance. Accordingly, it may be preferable that the embossing process is conducted at a temperature higher than the above maximum temperature. Further, taking a melting point into a consideration, the embossing process is conducted at a temperature lower than 250° C.

In the present invention, to ensure that embossing for film conveyance is provided on both the obverse and reverse surfaces of the film, and a obverse embossed section having a convex projecting on the obverse side on both ends of the film along the width and a reverse embossed section having a convex projecting on the reverse side, the following arrangement is used, for example: Embossing apparatuses, each for one-side treatment, are installed so as to contact each film surface in such a way that embossing is provided sequentially.

In the present invention, the obverse and reverse surfaces of the film are provided with embossing for film conveyance. Therefore, regulating force is applied to only the conveyance roller in contact with both the processed surfaces on the obverse and reverse surfaces of the film. Thus, without the surface of a conveyance roller being provided with processing required for the portion of strong regulating force, the film can be conveyed at a high speed by a so-called mirror surface roll, without the film surface being scratched or winkled. Moreover, this arrangement provides the capability of handling an optical film of any width.

In the present invention, a film with having sections for conveyance on both ends along the width is dried while being conveyed by a plurality of freely rotating conveyance rollers (free rolls not driven by the drive source).

The process from the aforementioned casting process to the subsequent drying process can be implemented in the atmosphere of either air or inert gas such as nitrogen gas. It goes without saying that drying atmosphere must be determined with due consideration given to the critical concentration of solvent explosion.

The embossed section for conveyance on the film is trimmed off subsequent to termination of drying by conveyance. After that, both ends of the film along the width are provided with the heightwise projections and depressions, (viz., provided with embossing) to ensure winding stability, so that the end portions will be bulky. Thus, the embossed section for film winding is formed.

Embossing for winding purposes is intended to avoid complete adhesion between the reverse and obverse surfaces of the film having been wound. Namely, patterns of a predetermined width made up of fine continuous projections and depressions are formed on the ends of the film along the width to be processed. This arrangement avoids complete or partial adhesion between the films having been wound, and removes the possibility of adverse effect being given to the film surface, whereby a possible trouble is eliminated in advance.

Different from the conveyance-use embossed sections of a hemi spherical convex whose apex is shaped in a gentle curve, wind-up embossed sections is preferably shaped in a convex having a small contact area like a quadrangular pyramid type convex in order to avoid a close contact between films.

The width of the embossing for winding purposes is preferably 5 through 40 mm, more preferably 7 through 15 mm. Embossing is preferably formed at a position 0 through 50 mm from the film end. There is no restriction to the form of embossing. The number of the starts of embossing processed at one position can be one, two or more.

The height of the projections and depression of embossing is preferably 1 through 40 μm, more preferably 2 through 35 μm, still more preferably 7 through 30 μm. If the height of the embossing is excessive, irregular winding or a rise on the roll end will result, and strain will occur to the film end. If the height of embossing is insufficient, the disorder in stretching cannot be controlled effectively. The height is preferably adjusted within the range of 1 through 25% with respect to the thickness of the resin film.

The percentage of the area of the portion observed as the protrusion of each start of embossing with respect to the entire embossing is preferably about 15 through 50%. If the protrusion contained in these starts is discontinuous, the number is preferably about 10 through 30 per square centimeter.

Normally, embossing can be formed when an emboss ring marked on the film is applied onto the back roll made of metal or rubber. It can be formed at the normal temperature, but is preferably formed at a temperature of Tg+20° C. or more, and at a melting point (Tm)+30° C. or less.

The amount of the residual solvent in the film having been dried is reduced to 3 wt % or less, preferably 1 wt % or less. After that, the film is wound in the form of a roll by a winding machine as a cellulose ester based resin film. Then the amount of residual solvent is reduced to 0.5 wt % or less. This procedure provides a film characterized by excellent dimensional stability.

The winding machine to be used can be the one employed for general use. The film can be wound according to such a winding method as a constant tension method, constant torque method, taper tension method, and program tension control method of constant internal stress.

The cellulose ester based resin film used in the present invention generally has a thickness of 20 through 200 µm. To meet the requirement for reduced thickness and weight of a polarizing plate used in the liquid crystal display apparatus (LCD), the thickness is preferably 30 through 120 µm, more preferably 40 through 100 µm. If the thickness is smaller, the toughness of the film will reduce. A trouble resulting from wrinkles or the like is likely to occur in the process of producing a polarizing plate. If the thickness is greater, there will be a poor contribution to the reduction in the thickness of the polarizing plate.

The following describes the optical film manufacturing method of the present invention based on the melted liquid-casting film formation technique. Incidentally, in order to conduct a melted liquid-casting film formation technique in the manufacturing apparatus for a solution-casting film formation technique shown in FIG. 1, it is necessary to use at least a different film forming device, and as the different film forming device, a film forming device disclosed in a Unexamined Japanese Patent Publication No. 2005-254812 may be employed.

The following describes the present invention with reference to an example of cellulose ester based resin.

According to the optical film manufacturing method of the present invention, the optical film is produced by the steps of:
 mixing the materials of the cellulose ester based resin film;
 using an extruder to perform melt extrusion onto a cooling drum from the casting die;
 circumscribing the materials to the cooling drum;
 cooling and solidifying them to form unstretched film; and
 holding both ends of the unstretched film having been separated by a separation roll along the width, for example, using an stretching apparatus, whereby the unstretched film is stretched.

The melted liquid-casting film formation method in the sense in which it is used here refers to the method using a casting die, melt extrusion method including the inflation method, calendar method, hot press method and injection molding method. In the present invention, it is preferred to adopt the method of using the casting die that is characterized by smaller irregularity in thickness, easier processing to a thickness of about 50 through 500 µm and greater capacity for reducing the irregularity in film thickness and retardation.

The same cellulose ester based resin as that used in the aforementioned solution-casting film formation method can be used as the cellulose ester based resin used in the optical film manufacturing method according to on the melted liquid-casting film formation method of the present invention.

In the optical film manufacturing method according to the melted liquid-casting film formation technique of the present invention, the cellulose ester based resin can contain additives for various purposes such as a plasticizer, ultraviolet absorber, antioxidant, matting agent, antistatic agent, flame retardant, dye and lubricant. The same additives as those used in the cellulose ester based resin used in the aforementioned solution-casting film formation method can be used as these additives.

In the optical film manufacturing method according to the melted liquid-casting film formation technique of the present invention, the materials of the cellulose ester based resin film are preferably dried in advance. A vacuum or pressure reduced drier or dehumidifying/hot air drier is preferably used to dry the film until the amount of moisture is reduced to 1000 ppm or less, preferably 200 ppm or less.

The cellulose ester based resin and additive are preferably mixed by a blender and others before melting. The plasticizer, ultraviolet absorber and matting agent can also be mixed by a blender and others before melting. A commonly used blender such as a V-shaped blender, conical screw type blender or horizontal cylindrical blender can be used for this purpose.

For example, the cellulose ester based resin having been dried by hot air, or under vacuum or under reduced pressure is extruded by an extruder and is molten at a temperature of about 200 through 300° C. This is filtered by a leaf disk type filter or the like to remove foreign substances.

When the material is fed to the supply hopper to the extruder, the atmosphere of vacuum, reduced pressure or inert gas is preferably created to avoid decomposition by oxidation.

If plasticizers or other additives are not mixed in advance, they can be mixed in the extruder. To ensure uniform addition, use of a mixing apparatus such as a static mixer is preferred.

In the present invention, in addition to the method of forming a film directly by an extruder after the material has been mixed, it is also possible to produce pellets and then to melt the pellets by the extruder, whereby a film is produced. Further, in a system containing a mixture of a plurality of materials having different melting points, half-molten substances are once formed at the temperature wherein only the material having a lower melting point melts. Then the half-molten substances are placed into the extruder, whereby the film is formed. When using a resin and additive easily subjected to thermal decomposition, in order to reduce the frequency of melting the resin, it is preferred to form a film directly without forming pellets, or to form a film after producing the aforementioned half-molten substances.

In the present invention, the extruder used to form a film can be either a single screw extruder or a twin screw extruder. When a film is formed directly without a pellet being formed of a material, an adequate degree of mixing is necessary. Thus, use of a twin screw extruder is preferred. Adequately mixing is ensured and a film can be formed by a single screw extruder if the shape of the screw is changed into that of a mixing type screw such as Maddox, Unimelt or Dulmage screw. In the single screw extruder or twin screw extruder, a vent is preferably provided, and gas is preferably removed from the vent using a vacuum pump or the like. When forming pellets or half-molten substances, either a single screw extruder or a twin screw extruder can be used.

The concentration of oxygen in the extruder or in the cooling process subsequent to extrusion is preferably reduced by replacing it by inert gas such as nitrogen gas or by reducing the pressure.

The preferred resin melting temperature in the extruder varies according to the viscosity and discharge rate of the resin and the thickness of the sheet to be produced. Generally, the melting temperature is preferred to be the glass transition temperature (Tg) or more, and glass transition temperature (Tg)+100° C. or less, with respect to the glass transition temperature (Tg) of the molding material. Further, the preferable melting temperature. The melting temperature is more preferred to be the glass transition temperature (Tg)+10° C. or more, and glass transition temperature (Tg)+90° C. or less. The melting viscosity at the time of extrusion is 10 through 100000 poises, preferably 100 through 10000 poises. The resin retention time in the extruder is preferred to be shorter. It is 5 minutes or less, more preferably 3 minutes or less, still more preferably 2 minutes or less. The retention time varies according to the type of the extruder and extrusion conditions, and can be reduced by adjusting the amount of the supplied material, L/D, rotational speed of the screw and the depth of the screw groove.

The shape and speed of the extruder screw are adequately determined according to the viscosity or discharge rate of the resin. In the present invention, the shear rate of the extruder is preferably 1/sec. through 10000/sec., more preferably 5/sec. through 1000/sec., still more preferably 10/sec. through 100/sec. The outlet side of the extruder is preferably provided with a pre-filter to avoid possible trapping of foreign substances in the gear pump and to reduce the load of the main filter.

For example, a 50/80/100-mesh screen or sintered filter of metallic fiber is preferably provided as required. Use of an on-line changeable type is preferred.

Stable conditions are preferably created for the flow in extrusion, for example, by introduction of a gear pump is preferred. Further, a filter 2 is preferably provided downstream from the pre-filter. A sintered filter of stainless steel fiber is preferably utilized. The sintered filter of stainless steel fiber is produced by entangling the stainless steel fibers in a complicate form, compressing them and sintering the contact positions to form an integral component. The filtering accuracy can be adjusted by changing the density according to the size of the fiber and the amount of compression. It is preferred to use a multi-layered body wherein coarse and fine levels in filtering accuracy are alternated several times on a continuous basis. It is also preferred to adopt an arrangement wherein the level of filtering accuracy is gradually improved, or the coarse and fine levels of filtering accuracy are alternated, because this arrangement prolongs the filtering life of the filter and improves the accuracy of capturing the foreign substances and gel. The filtering accuracy is preferably 0.5 μm or more without exceeding 50 μm.

In the present invention, the material of the cellulose ester based resin film is melt-extruded from the casting T-die by an extruder and is made to circumscribe the cooling drum so as to correct the surface, whereby an unstretched film is formed by cooling and solidification.

In the melted liquid-casting film formation method, if a scratch or foreign substances are attached to the casting die, a streak-like defect may occur. Such a defect is called a die line. To reduce the size of the defect on the surface such as a die line, the piping from the extruder to the casting die is preferably arranged in such as structure as to minimize the portion where the resin stay stagnant without moving. It is important to minimize the damage inside the casting die or on the lip. Volatile components may segregate from the resin around the casting die to cause a die line. The atmosphere containing the volatile components is preferably absorbed. Further, segregation may also occur to the apparatus for electrostatic application or the like. Segregation is preferably avoided by application of alternating current or use of other heating means.

There is no restriction to the type of the casting die if it can be used to manufacture the sheet and film. A coat hanger die is preferably used. The gap t of the lip section is preferably 0.1 mm or more without exceeding 2 mm. The length L of the land section is preferably 5 mm or more without exceeding 50 mm. The L/t ratio is preferably 10 or more.

The thickness adjusting mechanism that can be preferably used includes a heater type mechanism wherein temperature is adjusted by widthwise separation, a manual bolt type mechanism wherein the lip opening is adjusted mechanically, and a heat bolt type mechanism wherein the lip opening is adjusted through expansion and contraction of the bolt by a heater.

The casting die is formed, for example, by spraying or plating of the hard chromium, chromium carbide, chromium nitride, titanium carbide, titanium carbonitride, titanium nitride, cemented carbide and ceramics (tungsten carbide, aluminum oxide, chromium oxide). The surface is provided with buffing, lapping by a grindstone of count 1000 and thereafter, plane surface cutting (cutting direction is perpendicular to the flow of resin) using a diamond grindstone of count 1000 or thereafter, electrolytic grinding, or electrolytic complex grinding, for example.

The preferred material of the die lip portion is the same as that of the casting die. The accuracy on the surface of the lip section is preferably 0.5 S or less, more preferably 0.2 S or less.

Here the cellulose ester based resin is melt-extruded on the cooling drum from the casting die. The temperature of the cooling drum is preferably adjusted by feeding such a heat medium as water or oil inside the cooling drum.

In the present invention, an absorbing apparatus is preferably mounted close to the casting die in order to prevent the casting die and cooling drum from being contaminated by a sublimate, when the cellulose ester based resin flows out of the casting die. The absorbing apparatus should be heated by a heater or the like to ensure that a sublimate will not attach to the apparatus per se. If the absorption pressure is excessive, an adverse effect on film quality such as formation of uneven steps may be given. Conversely, it is insufficient, the sublimate cannot be absorbed effectively. Action must be taken to ensure appropriate absorption pressure.

In the present invention, the film and cooling drum are preferably kept in close contact. To keep the film and cooling drum in close contact with each other, a touch roll is used to press them against each other. Further, an electrostatic close adhesion method, air knife or pressure reducing chamber can also be used. Further, the cooling drum can be provided with a cleaning device such as a cleaning roll.

The irregularity of temperature on the cooling drum is preferably 0.5° C. or less. Irregularity in speed is preferably 0.5% or less. The cooling drum surface can be provided with hard chromium plating, without the present invention being restricted thereto. Surface roughness is preferably 0.1 S or less. The touch roll is preferably made of a metal or a metal roll wound with resin or rubber In the present invention, the film-like cellulose ester based resin in a molten form fed from the T-die is conveyed while being kept in contact with the cooling drum and is cooled and solidified, whereby an unstretched cellulose ester based resin film is produced.

In the optical film manufacturing method of the present invention, the film separated from the cooling drum by the separation roll, and cooled and solidified is conveyed by a plurality of freely rotating conveyance rollers (free rolls not driven by the drive source). Prior to this film conveyance process, embossing is provided on both ends of the formed film along the width, whereby an embossed section for film conveyance is formed.

In the present invention, when a process of stretching by a tenter is included after the film forming process, embossing is preferably provided after stretching by the tenter. To be more specific, in the present invention, subsequent to the stretching process for stretching of the film along the width by the tenter, both ends of the film along the width are provided with embossing, thereby forming the embossed section for film conveyance.

This is because of the following reason: If both ends of the film along the width is provided with embossing prior to stretching by a tenter, the embossed section may be burst by the subsequent stretching, and the clipping portion of the film both ends due to the tenter and the embossed section may overlap each other, with the result that a burst will occur.

The cooled and solidified film separated from the cooling drum by the separation roll is led to the stretching machine through the dancer roll (film tension adjusting roll), wherein the film is stretched along the width, whereby molecules in the film are stretched.

When the film is stretched along the width, a commonly known tenter is used preferably. Stretching along the width allows the lamination with the polarizing film to be achieved in the form of a roll, and this is preferred. Stretching along the width allows the low axis of the operation made up of a cellulose ester based resin film to be maintained along the width.

In the meantime, the transmission axis of the polarizing film also lies along the width in normal cases. When the liquid crystal display apparatus incorporates the polarizing plate having been laminated so that the transmission axis of the polarizing film and the low axis of the optical film will be parallel with each other, the display contrast of the liquid crystal display apparatus is improved and excellent angle of field is obtained.

The aforementioned stretching is so conditioned for stretching that the temperature and draw rate can be selected to get a desired retardation characteristic. Normally, the draw rate is 1.1 through 2.0, preferably 1.2 through 1.5. When the glass transition temperature of the resin constituting the film is assumed as Tg, the stretching temperature is usually in the range from Tg through Tg+50° C., preferably Tg through Tg+40° C. If the draw rate is insufficient, a desired retardation cannot be obtained in some cases. Conversely, if it is excessive, the film also breaks down in some cases. If the stretching temperature is too low, the film breaks down in some cases. If it is too high, a desired retardation cannot be obtained in some cases.

Stretching of the film along the width is preferably carried out based on the controlled uniform temperature distribution at a temperature range of preferably within ±2° C., more preferably within ±1° C., still more preferably within ±0.5° C.

To adjust the retardation and reduce the dimensional change rate of the cellulose ester based resin film produced according to the aforementioned method, the film can be orientated or shrunk along the length or along the width. To shrink the film along the length, for example, the widthwise stretching along the width is clipped out temporarily and the film along the length is loosened. Alternatively, the film can be shrunken by a gradual reduction of the space between adjacent clips of the lateral stretching machine. In the latter case, the clipped portion is driven, and the space of adjacent clips along the length is smoothly and gradually reduced, using a commonly used simultaneous biaxial stretching machine, for example, according to the pantograph or linear drive method. Combination with stretching in a desired direction (in a slanting direction) is also possible if required. Shrinkage from 0.5% to 10% along the length and along the width permits reduction of the dimensional change rate of the optical film.

The procedure of embossing both ends of the film along the width subsequent to stretching by a tenter is the same as that of embossing according to the aforementioned solution-casting film formation method.

In the present invention, the clipping portion on both ends of the film is removed by a slitter subsequent to stretching by the tenter. Then both ends of the film is provided with embossing for conveyance. Without the surface of a conveyance roller being provided with processing required for the portion of strong regulating force, the film can be conveyed by a so-called mirror surface roll without the surface of the film being scratched or winkled. This optical film manufacturing method is further characterized by the capability of handling an optical film of any width and a high conveyance speed.

After the film has been dried by conveyance, the embossed section of the film for conveyance is trimmed off. Then both ends of the film along the width are provided with heightwise projections and depressions required to stabilize the winding property. In other words, both ends are provided with embossing so that the ends are bulky along the height. Thus, a film winding embossed section is formed.

The procedure for embossing for winding purposes is the same as that for embossing for winding purposes according to the aforementioned solution-casting film formation method.

The thickness of the optical film differs according to the purpose of use. The thickness of the film as a finished film used in the present invention is 20 through 200 μm, preferably 30 through 120 μm according to the current trend for thinner film, more preferably 40 through 100 μm. The extrusion flow rate, clearance at the casting outlet of the casting die and cooling drum speed can be controlled to ensure that the average film thickness will reach a desired thickness.

The optical film manufacturing apparatus of the present invention includes:

a casting apparatus for flow-casting a resin solution or molten resin by the solution-casting film formation method or melted liquid-casting film formation-method so as to form a film-like substance;

an embossed section forming apparatus for forming an embossed section for film conveyance by embossing both ends of the formed film along the width, before a film conveyance apparatus for conveying the film by a plurality of freely rotatable conveyance rollers (free rolls that are not driven by a drive source);

a conveyance apparatus for using a freely rotatable conveyance roller to convey the film having embossed sections for conveyance on both ends along the width thereof;

a trimming apparatus for trimming and removing the embossed sections for conveyance of the film after conveyance;

an embossed section forming apparatus for forming film winding embossed sections on both ends of the film along the width by forming an emboss having the height required to wind the film; and a winding apparatus for winding the film having embossed sections for winding on both ends along the width thereof.

The optical film manufacturing apparatus of the present invention provides the advantages wherein, without the surface of a conveyance roller per se being provided with processing required for the portion of strong regulating force, the film can be conveyed by a freely rotatable conveyance roller with a so-called mirror surface roll without the surface thereof being scratched or winkled. The present invention further provides the capability of handling an optical film of any width, a high conveyance speed, and improved optical film productivity.

The optical film manufacturing apparatus of the present invention is further provided with a film stretching apparatus (tenter) for orientating the film having been formed by the casting apparatus along the width. This optical film manufacturing apparatus includes the steps of orienting the film along the width by the tenter subsequent to the film forming process; trimming and removing the clipped portions on both ends of the film along the width due to the stretching apparatus by using a trimming apparatus after stretching; and embossing both ends of the stretched film along the width by the embossed section forming apparatus, thereby forming the embossed section for film for conveyance.

As described above, if both ends of the film along the width are provided with embossing before stretching by the tenter, the embossed section may be broken by subsequent stretching, or the clipping portion on both ends of the film and the embossed section may be overlapped with each other due to the tenter, with the result that the embossed section is broken. To avoid this, in the optical film manufacturing apparatus of the present invention, the clipping portion on both ends of the film is removed by the slitter after stretching by the tenter. After that, both ends of the film are embossed for conveyance. This arrangement ensures that, without the portion of strong regulating force being provided on the surface of a conveyance roller, the film can be conveyed by a so-called mirror surface roll, without the surface of the film being scratched or winkled. This arrangement further provides the capability of handling an optical film of any width, and a high conveyance speed.

In the optical film manufacturing apparatus of the present invention, furthermore, an embossed section forming section forms a obverse embossed section having a convex projecting on the obverse side and a reverse side embossed section having a convex projecting on the reverse side on both ends of the film along the width. If embossing for film conveyance is provided only on one of the obverse and reverse sides of the film, regulating force will be applied to only the conveyance roller in contact with the processed surface, without regulating force being applied to the conveyance roller in contact with the unprocessed surface. In the apparatus of the present invention, however, as described above, regulating force is applied to the conveyance roller in contact with the embossed sections on the obverse and reverse surfaces of the film. Without the surface of a conveyance roller per se being provided with processing required for the portion of strong regulating force, the film can be conveyed at a high speed by a so-called mirror surface roll, without the surface thereof being scratched or winkled. Moreover, this arrangement provides the capability of handling an optical film of any width.

In the optical film manufacturing apparatus of the present invention, the embossed sections for conveyance provided on the obverse sides of both ends of the film along the width and those on the reverse sides are formed in staggered configuration with respect to each other by the embossed section forming apparatus for film conveyance. The apparatus of the present invention ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

In the optical film manufacturing apparatus of the present invention, furthermore, the embosses section forming section for film conveyance forms the embossed sections for film conveyance on both ends of the film along the width, and each of these sections has a width of 20 through 100 mm in terms of the total of the embossed section for conveyance on the obverse side and that on the reverse side, from both ends of the film along the width. If the width of the embossed section for film conveyance is excessive, the regulating force for the roll can be increased, but the area of the portion of greater regulating force will be excessive. This will cause wrinkles to occur to the portion of greater regulating force, and the film may break. In the present invention, the width of the embossed section for film conveyance formed on both ends of the film along the width is kept within the aforementioned range. The apparatus of the present invention ensures that, without the surface of a conveyance roller per se being provided with processing required for the portion of strong regulating force, the film can be conveyed by a so-called mirror surface roll, without the surface of the optical film being scratched or winkled. Moreover, this arrangement provides the capability of handling an optical film of any width, as well as high-speed conveyance.

When bonded on at least one side of the polarizing film, the optical film obtained from the present invention can be used as an elliptical polarizing plate.

The polarizing film is produced by using a dichromatic dye such as iodine to longitudinally orient the film that has been used so far and can be stretched, such as a polyvinyl alcohol film. Since the polarizing film per se has no sufficient strength and durability, the non-anisotropic cellulose triacetate film is generally bonded on both surfaces thereof as a protective film, and is used as a polarizing plate. The optical film obtained from the present invention can be produced by bonding on the polarizing plate equipped with the aforementioned protective film, or by bonding directly on the polarizing film also serving as a protective film.

Especially, the optical film obtained from the present invention has a low axis along the width, and can be bonded with the polarizing film on the longer rolls without being trimmed. This arrangement ensures drastic improvement of the polarizing plate productivity.

The polarizing plate can be a bonded type plate (easily bonded with a liquid cell or the like by separating the separable sheet) formed by laminating the separable sheets on one surface or both surfaces through a pressure sensitive adhesive (e.g. acryl based pressure sensitive adhesive).

The polarizing plate having been obtained in this manner is installed on a single surface or both surfaces. This is used to produce a liquid crystal display apparatus.

An image display apparatus having a high contrast ratio over a wide range to ensure a clearly visible display—especially a liquid crystal display apparatus operating in the IPS mode—is a liquid crystal display apparatus provided with a liquid cell driven in the IPS mode made up of a pair of substrate gripping a liquid crystal layer, and a pair of polarizing plates arranged perpendicular to both sides of the aforementioned liquid cell. The liquid cell side of at least one of the polarizing plates is equipped with the cellulose ester based resin film of the present invention.

When used on the liquid crystal display apparatus, the optical film produced in the present invention provides a liquid crystal display apparatus having an excellent angle of field.

The optical film produced in the present invention can be used as a substrate of an antireflection film or optical correction film.

EXAMPLE

The following describes the examples of the present invention without being restricted thereto.

Examples 1 through 7

At first, dope was prepared before producing a cellulose acylate film having a target dry thickness of 80 μm based on the solution-casting film formation method according to the optical film manufacturing method of the present invention.

Preparation of Dope Solution

Cellulose acylate: 100 parts by mass
Triphenylphosphate: 10 parts by mass
Ethylphthalyethylglycolate: 2 parts by mass
TINUVIN 109 (by Ciba Specialty Chemicals K.K): 0.5 parts by mass
TINUVIN 171 (by Ciba Specialty Chemicals K.K): 0.5 parts by mass
TINUVIN 326 (by Ciba Specialty Chemicals K.K): 0.3 parts by mass
AEROSIL 200V (Nippon Aerosil Co., Ltd.): 0.1 parts by mass
Methylene chloride: 300 parts by mass
Ethanol: 40 parts by mass The dope was prepared for casting purpose by taking the steps: of putting the aforementioned materials sequentially in an enclosed container; raising the temperature in the container from 20° C. to 80° C.; stirring the mixture for three hours at the temperature kept at 80° C.; dissolving the cellulose acylate completely; stopping the stirring thereafter; lowering the liquid temperature to 43° C.; feeding this dope to a filtering device, where the dope was filtered by filter paper (filter paper Azumi No. 244 by AZUMI FILTERPAPER CO., LTD).

The dope having been prepared in the aforementioned manner was passed through the casting die having the temperature kept at 35° C., and was flow-cast on the supporting member made up of a stainless steel-made endless belt at a temperature of 33° C., whereby a web was formed. After having been dried on the supporting member until the amount of the residual solvent in the web is reduced to 80 wt %, the web was separated from the supporting member by he separation roll at a separation tension of 127 N/m. The film having been separated was stretched by a tenter, and the clipped portions on both ends of the film along the width due to the stretching apparatus was trimmed off by a slitter. Before the film conveyance process for conveying the film by a plurality of freely rotating conveyance rollers (free rolls not driven by the drive source), the emboss ring kept at to a temperature of 250° C. was pressed against both ends of the stretched film along the width wherein the amount and force of pressing were adjusted. In this process, the obverse and reverse surfaces of the film were provided with embossing wherein the width is as shows in the following Table 1. Thus, an embossed section for film conveyance containing a obverse embossed section having a convex portion protruding to the obverse side and a reverse embossed section having a convex portion protruding to the reverse side was formed on both ends of the film along the width. In this case, the obverse side embossed section for conveyance on both ends of the film along the width and the reverse side embossed section for conveyance were formed in staggered configuration with respect to each other. The embossed sections for film conveyance formed on both ends of the film along the width each have a width of 20 through 100 mm in terms of the total of the embossed section for conveyance on the obverse side and that on the reverse side, from both ends of the film along the width. Table 1 shows the amount of the residual solvent in the film at the time of embossing.

Then the film was dried by being conveyed by rolls in a drying process equipped with 500 freely rotatable conveyance rollers (surface length: 2200 mm; diameter: 110 mm) including a mirror surface wherein the maximum height (Rmax) representing the surface roughness laid down in the JIS B0601 was 0.8 μm. After that, the embossed sections for conveyance provided on both ends of the film were removed by a slitter.

Further, the emboss ring kept at a temperature of 250° C. was pressed against both ends of the stretched film along the width having been conveyed wherein the amount and force of pressing were adjusted. During this process, embossing for winding having a height of 5 μm and a width of 10 mm was provided to cover a width of 12 mm only on one side of the film. The film having embossed sections for winding on both ends was wound by a winding apparatus at a uniform tension of 98.0 N/m, whereby an optical cellulose acylate film having a thickness of 80 μm was produced.

The following Table 1 summarizes measurements at the embossed section for conveyance, including the weight of the film residual solvent (wt %), emboss width (mm) for conveyance (by a measuring instrument for both sides), dry temperature (° C.), dry length (m), conveyance speed (m/min.) and width (mm) of the film product having been wound.

TABLE 1

| | Embossing section for conveyance | | Dry temperature (° C.) | Dry length (m) | Conveyance speed (m/min) | Width of product having been wound (mm) |
| | Amount of residual solvent (wt %) | Emboss width (mm) | | | | |
| --- | --- | --- | --- | --- | --- | --- |
| Example 1 | 10 | 100 | 100 | 1000 | 50 | 1900 |
| Example 2 | 20 | 100 | 100 | 1000 | 50 | 1900 |
| Example 3 | 10 | 50 | 100 | 1000 | 50 | 1900 |
| Example 4 | 10 | 20 | 90 | 800 | 45 | 1900 |
| Example 5 | 5 | 20 | 100 | 1000 | 50 | 1900 |
| Example 6 | 10 | 100 | 100 | 1000 | 50 | 1330 |
| Example 7 | 10 | 100 | 110 | 1000 | 65 | 1900 |

Example 1 through Example 7 of the present invention provide the high-quality cellulose acylate films of several different widths without any scratch that might be given in the film conveyance process or any wrinkle that might be caused in the conveyance process.

Examples 8 Through 14

In the manner similar to that of the aforementioned Examples 1 through 7, a cellulose acylate film was produced. The difference from the aforementioned Examples 1 through 7 was that the thickness of the cellulose acylate film is 40 μm. Otherwise, the Examples 8 through 14 are the same as the aforementioned Examples 1 through 7.

The following Table 2 summarizes measurements at the embossed section for conveyance, including the weight of the film residual solvent (wt %), emboss width (mm) for conveyance (by a measuring instrument for both sides), dry temperature (° C.), dry length (m), conveyance speed (m/min.) and width (mm) of the film product having been wound.

TABLE 2

| | Embossing section for conveyance | | | | | Width of product |
|---|---|---|---|---|---|---|
| | Amount of residual solvent (wt %) | Emboss width (mm) | Dry temperature (° C.) | Dry length (m) | Conveyance speed (m/min) | having been wound (mm) |
| Example 8 | 8 | 100 | 100 | 1000 | 50 | 1900 |
| Example 9 | 15 | 100 | 100 | 1000 | 50 | 1900 |
| Example 10 | 8 | 50 | 100 | 1000 | 50 | 1900 |
| Example 11 | 8 | 20 | 90 | 800 | 45 | 1900 |
| Example 12 | 3 | 20 | 100 | 1000 | 50 | 1900 |
| Example 13 | 8 | 100 | 100 | 1000 | 50 | 1330 |
| Example 14 | 8 | 100 | 110 | 1000 | 50 | 1900 |

Example 8 through Example 14 of the present invention provide the high-quality cellulose acylate films of several different widths without any scratch that might be given in the film conveyance process or any wrinkle that might be caused in the conveyance process, although the film is thin.

Example 15 Through 21

A cellulose acylate film having a target dry thickness of 80 μm by the melted liquid-casting film formation technique was produced based on the optical film manufacturing method of the present invention.

Cycloolefin resin: 100 parts by mass
Triphenyl phosphate: 10 parts by mass
Ethylphthalylethylglycolate: 2 parts by mass
TINUVIN 109 (by Ciba Specialty Chemicals K.K): 0.5 parts by mass
TINUVIN 171 (by Ciba Specialty Chemicals K.K): 0.5 parts by mass
TINUVIN 326 (by Ciba Specialty Chemicals K.K): 0.3 parts by mass
AEROSIL 200V (by Nippon Aerosil Co., Ltd.): 0.1 parts by mass
Antioxidant: 0.01 parts by mass
2,6-di-t-butyl-p-cresol
Pentaerythrityl-tetrakis[3-(3,5-di-t-butyl-4-hydroxyphenyl)propionate]

An unstretched cycloolefin resin film (web) was produced by taking the steps of: melting, mixing and pelletizing the mixture of the aforementioned materials at 230° C. with a twin screw type extruder; melt-extruding these pellets from the T-die in the form of a film on the cooling drum at a melting temperature of 250° C.; and cooling and solidifying the mixture.

Then the cycloolefin resin film (web) having been separated by a separation roll was led into a tenter on a continuous basis and was drawn at a draw rate of 1.5 at 160° C. along the width. Then the film was relieved by 3% along the width, was cooled down to 30° C., and was released from the clip. Then the clip holder was trimmed off by a slitter to a predetermined width.

When the temperature of the film surface has reached a predetermined level, before the film conveyance process for conveying the film by freely rotating conveyance rollers, the emboss ring kept at a temperature of 250° C. was pressed against both ends of the stretched film along the width. During this process, the obverse and reverse surfaces of the film were provided with embossing wherein the width is as shown in the following Table 1. Thus, an embossed section for film conveyance containing a obverse embossed section having a convex portion protruding to the obverse side and a reverse embossed section having a convex portion protruding to the reverse side was formed on both ends of the film along the width. In this case, the obverse side embossed section for conveyance on both ends of the film along the width and the reverse side embossed section for conveyance were formed in staggered configuration with respect to each other. The embossed sections for film conveyance formed on both ends of the film along the width each had a width of 20 through 100 mm in terms of the total of the embossed section for conveyance on the obverse side and that on the reverse side, from both ends of the film along the width.

Then the film was cooled by being conveyed by rolls in a cooling process equipped with 500 freely rotatable conveyance rollers (surface length: 2200 mm; diameter: 110 mm) including a mirror surface wherein the maximum height (Rmax) representing the surface roughness laid down in the JIS B0601 was 0.8 μm. After that, the embossed sections for conveyance provided on both ends of the film were removed by a slitter.

Further, the emboss ring kept at a temperature of 250° C. was pressed against both ends of the stretched film along the width having been conveyed, wherein the amount and force of pressing were adjusted. During this process, embossing for winding having a height of 5 μm and a width of 10 mm was provided to cover a width of 12 mm only on one side of the film. The film having embossed sections for winding on both ends was wound by a winding apparatus at a uniform tension of 98.0 N/m, whereby an optical cellulose acylate film having a thickness of 80 μm was produced.

The following Table 3 summarizes measurements at the embossed section for the film surface temperature and conveyance, including the weight of the film (mm), emboss width (mm) for conveyance (by a measuring instrument for both sides), conveyance speed (m/min.) and width (mm) of the film product having been wound.

TABLE 3

| | Embossing section for conveyance | | | Width of product |
|---|---|---|---|---|
| | Film surface temperature (° C.) | Emboss width (mm) | Conveyance speed (m/min) | having been wound (mm) |
| Example 15 | 80 | 100 | 100 | 1900 |
| Example 16 | 100 | 100 | 100 | 1900 |
| Example 17 | 80 | 50 | 100 | 1900 |
| Example 18 | 80 | 20 | 90 | 1900 |
| Example 19 | 30 | 20 | 100 | 1900 |
| Example 20 | 80 | 100 | 100 | 1330 |
| Example 21 | 80 | 100 | 100 | 1900 |

Example 15 through Example 21 of the present invention provide the high-quality cellulose acylate films of several different widths without any scratch that might be given in the film conveyance process or any wrinkle that might be caused in the conveyance process, although the conveyance speed is high.

Comparative Examples 1 Through 3

For the sake of comparison, in the manner similar to that of the aforementioned Examples 1 through 3, a cellulose acylate film was produced. The difference from the aforementioned Examples 1 through 3 was that embossing for conveyance was not provided. The conveyance roller used had a surface length of 2200 mm and a width of 80 mm at a position 50 mm from both ends of the conveyance roller wherein a groove was formed, with its width of 0.2 mm, depth of 0.1 mm and inter-groove pitch of 0.7 mm. The maximum height (Rmax) in the surface roughness of the mirror surface section was 0.8 µm. Otherwise, Comparative Examples 1 through 3 are the same as the aforementioned Examples 1 through 3.

As a result, in the Comparative Example 1, a damage was found on the film surface, and the film could not be used as an optical film. In the Comparative Examples 2 and 3, all the films were observed to contain wrinkles, and were difficult to manufacture.

What is claimed is:

1. An optical film manufacturing method, comprising steps of:
    forming a film by casting a liquid-state resin;
    embossing both ends of the formed film in a lateral direction of the film so as to form embossed sections for conveying the film;
    conveying the film having the embossed sections by a freely rotatable conveyance roller in a drying room;
    trimming and removing the embossed sections of the film after the conveying step; and
    winding up the film,
    wherein in the drying room, the film is dried under a drying atmosphere with a drying temperature, and at the embossing step, the embossed sections are formed with an embossing member heated to an embossing temperature higher than the drying temperature.

2. The optical film manufacturing method of claim 1, wherein the embossing step is conducted on both obverse and reverse surfaces of the film so as to form obverse-side embossed sections having respective convexes projecting on both ends of the obverse surface and reverse-side embossed sections having respective convexes projecting on both ends of the reverse surface.

3. The optical film manufacturing method of claim 2, wherein the obverse-side embossed sections are formed on positions different from positions of the reverse-side embossed sections along the lateral direction of the film.

4. The optical film manufacturing method of claim 2, wherein the sum of respective widths of the obverse-side embossed sections and the reverse-side embossed sections is from 20 mm to 100 mm.

5. The optical film manufacturing method of claim 2, wherein the projecting convex is a hemi spherical convex whose apex is shaped in a gentle curve.

6. The optical film manufacturing method of claim 2, wherein the projecting convex has a height of from 1 µm to 40 µm.

7. The optical film manufacturing method of claim 1, wherein the conveyance roller has a conveyance surface to come in contact with the film and the conveyance surface is made in a mirror surface.

8. The optical film manufacturing method of claim 1, after the film forming step, further comprising:
    clipping both ends of the film and stretching the film in a lateral direction; and
    trimming and removing the clipped portions of the film; wherein after the steps of trimming and removing, the embossing step is conducted for both ends of the film in a lateral direction of the film to form the embossed sections for conveying the film.

9. The optical film manufacturing method of claim 1, after the steps of trimming and removing the embossed sections of the film after the conveying step, further comprising:
    embossing both ends of the film in a lateral direction of the film so as to form embossed sections for winding up the film.

10. An optical film manufacturing apparatus, comprising:
    a casting section for forming a film by casting a liquid-state resin;
    an embossing section for embossing both ends of the film in a lateral direction of the film so as to form embossed sections for conveying the film;
    a conveying section for conveying the film having the embossed sections by a freely rotatable conveyance roller in a drying room;
    a trimming section for trimming and removing the embossed sections of the film after conveying the film; and
    a winding section for winding up the film,
    wherein the drying room is operable to dry the film under a drying atmosphere with a drying temperature, and the embossing section has an embossing member heated to an embossing temperature higher than the drying temperature during the formation of the embossed sections.

11. The optical film manufacturing apparatus of claim 10, wherein the embossing section conducts the embossing on both obverse and reverse surfaces of the film so as to form obverse-side embossed sections having respective convexes projecting on both ends of the obverse surface and reverse-side embossed sections having respective convexes projecting on both ends of the reverse surface.

12. The optical film manufacturing apparatus of claim 11, wherein the obverse-side embossed sections are formed on positions different from positions of the reverse-side embossed sections along the lateral direction of the film.

13. The optical film manufacturing apparatus of claim 11, wherein the sum of respective widths of the obverse-side embossed sections and the reverse-side embossed sections is from 20 mm to 100 mm.

14. The optical film manufacturing apparatus of claim 10, further comprising:
    a stretching section for clipping both ends of the film and stretching the film in a lateral direction, and
    a trimming section for trimming and removing the clipped portions of the film; wherein after trimming and removing the clipped portions, the embossing section conducts the embossing for both ends of the film in a lateral direction of the film to form the embossed sections for conveying the film.

15. The optical film manufacturing apparatus of claim 10, further comprising:
    an embossing section for embossing both ends of the film in a lateral direction of the film so as to form embossed sections for winding up the film after trimming and removing the embossed sections for conveying the film.

16. The optical film manufacturing method of claim 1, wherein the embossing temperature is $(Tg +20)°$ C. or more and $(Tm +30)°$ C. or less, where Tg represents the glass transition temperature of the film and Tm represent a melting point of the film.

* * * * *